Patented Nov. 28, 1944

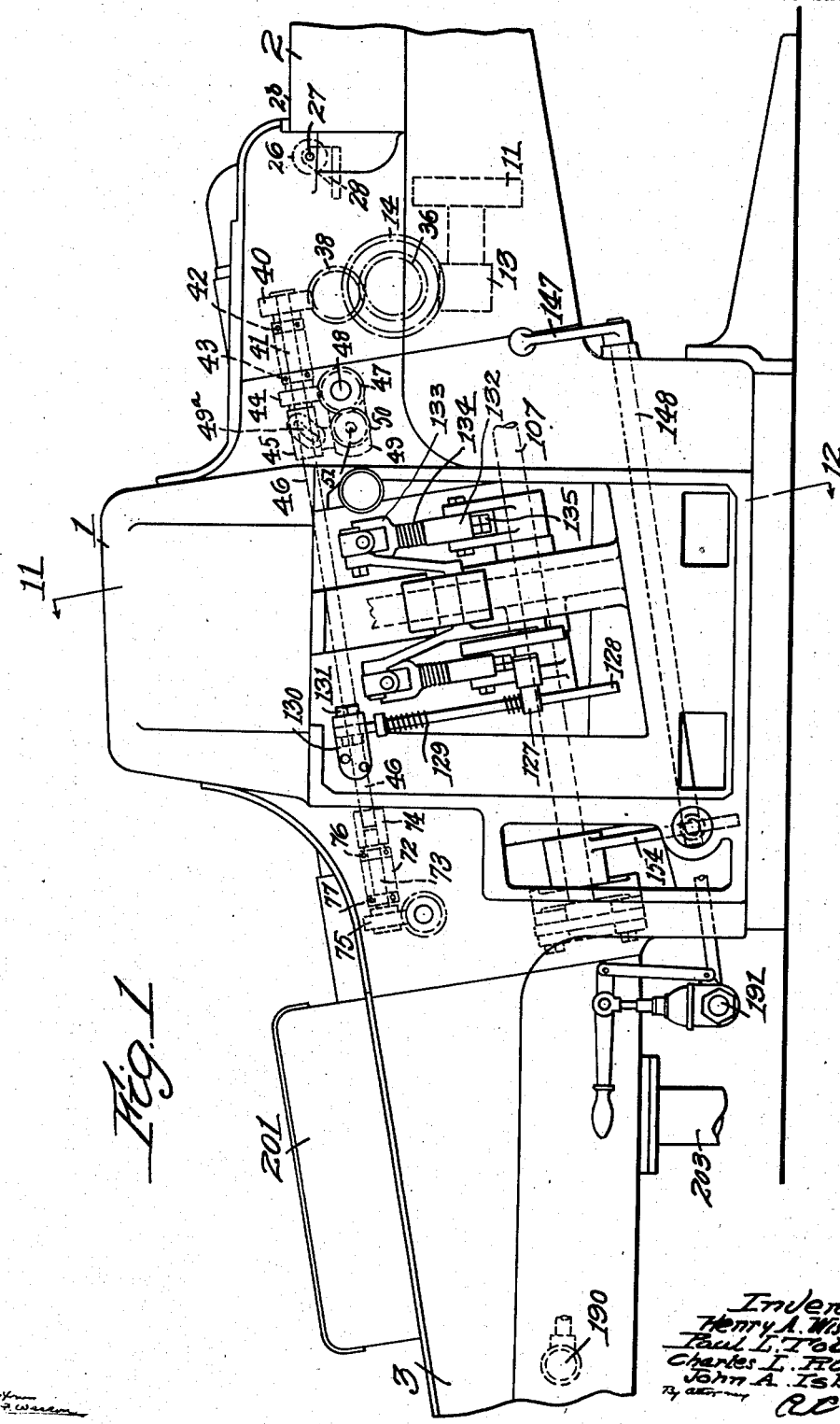

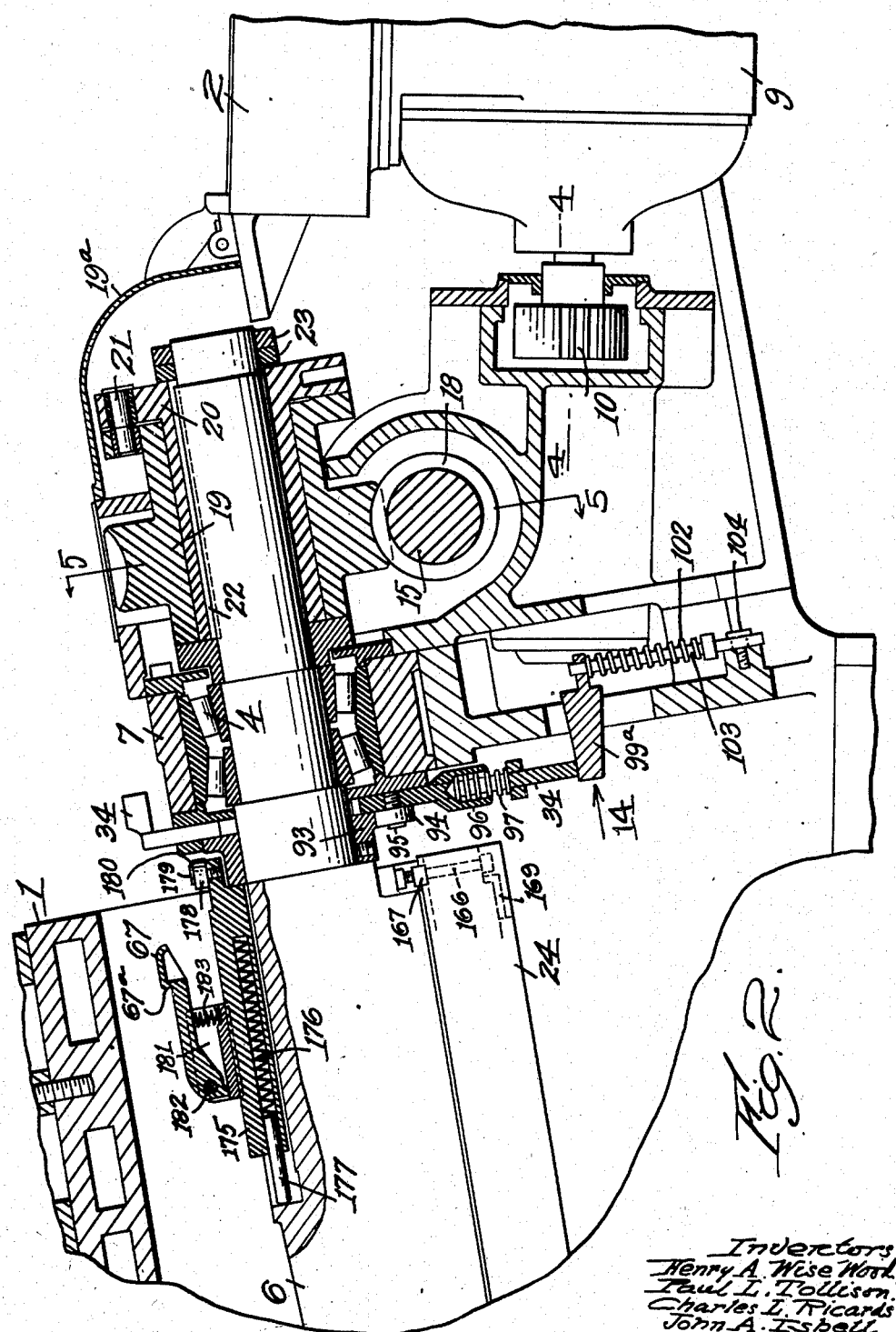

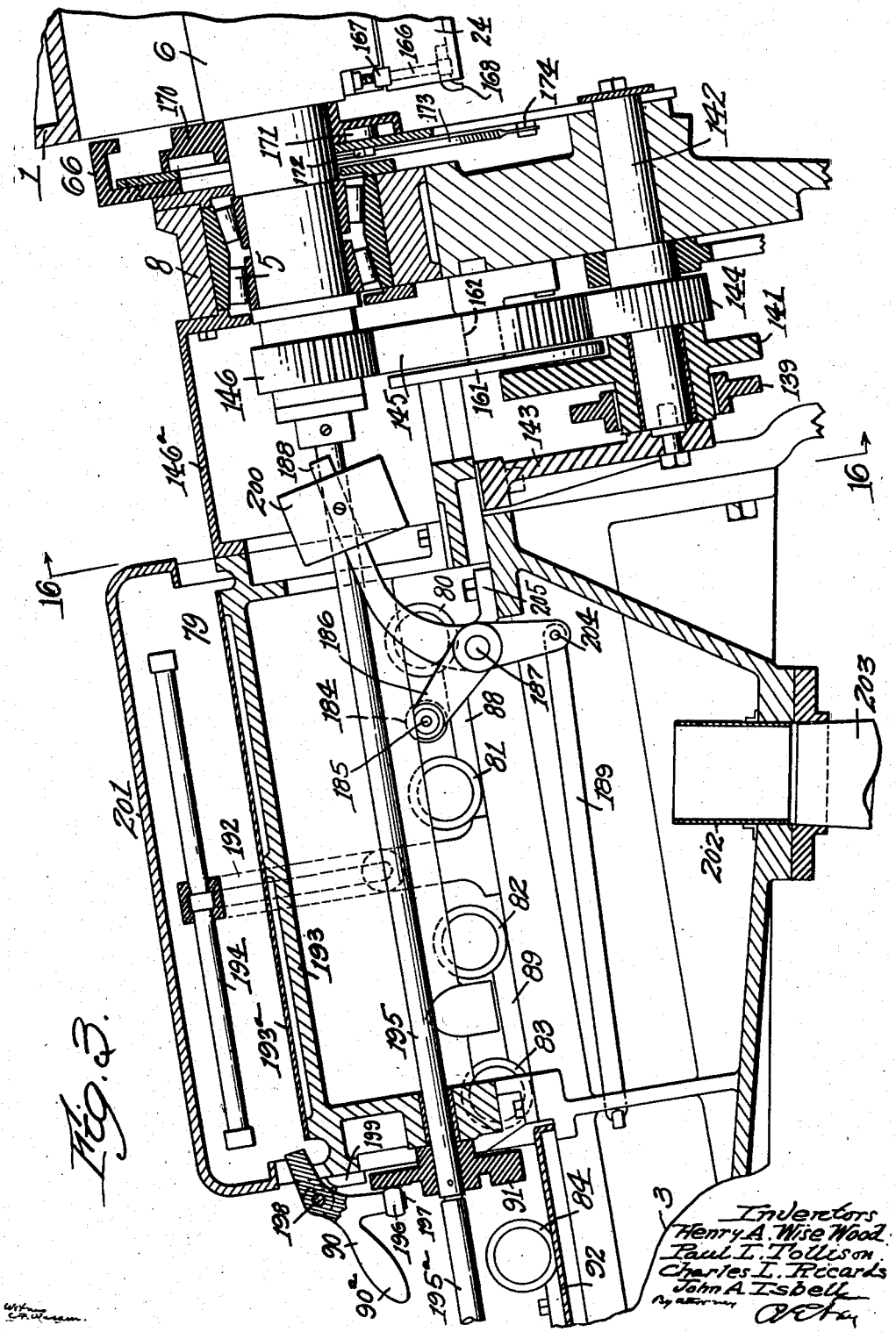

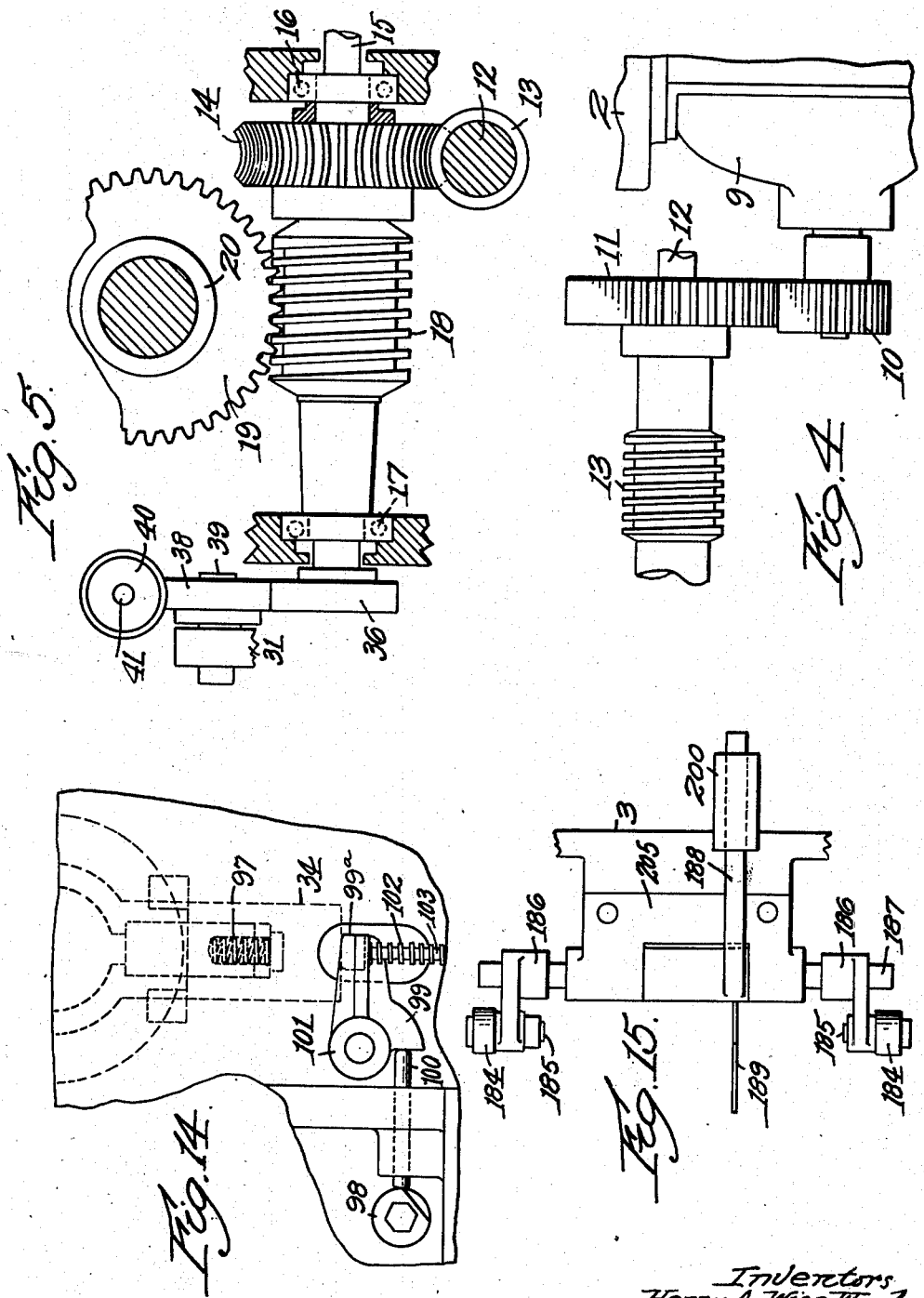

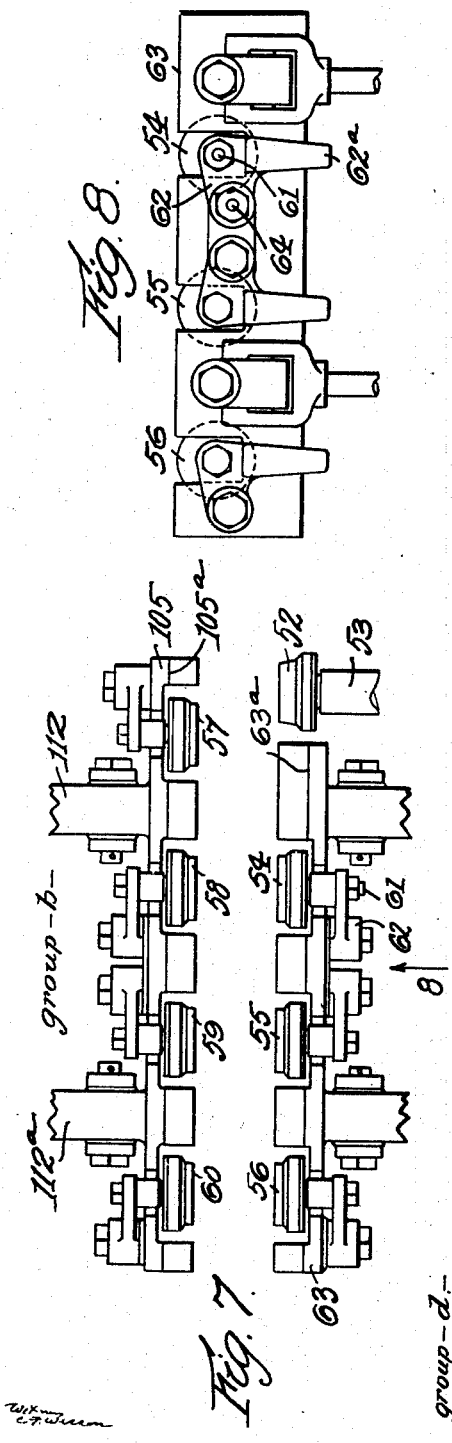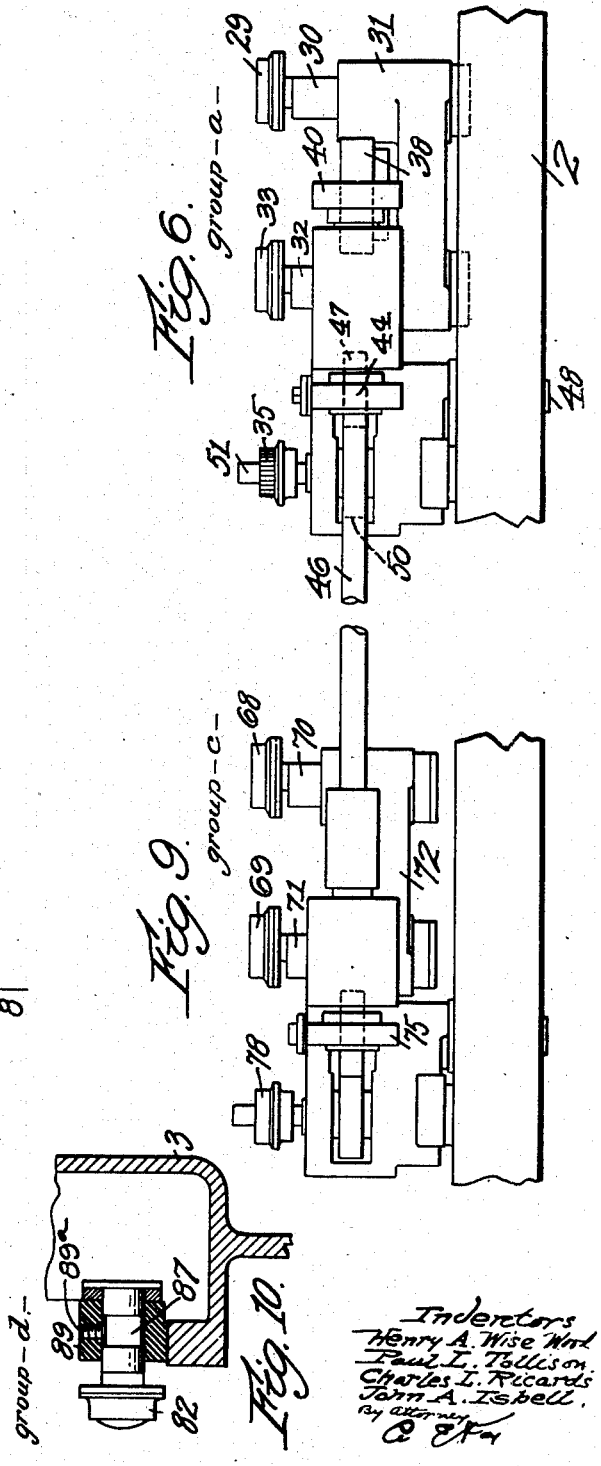

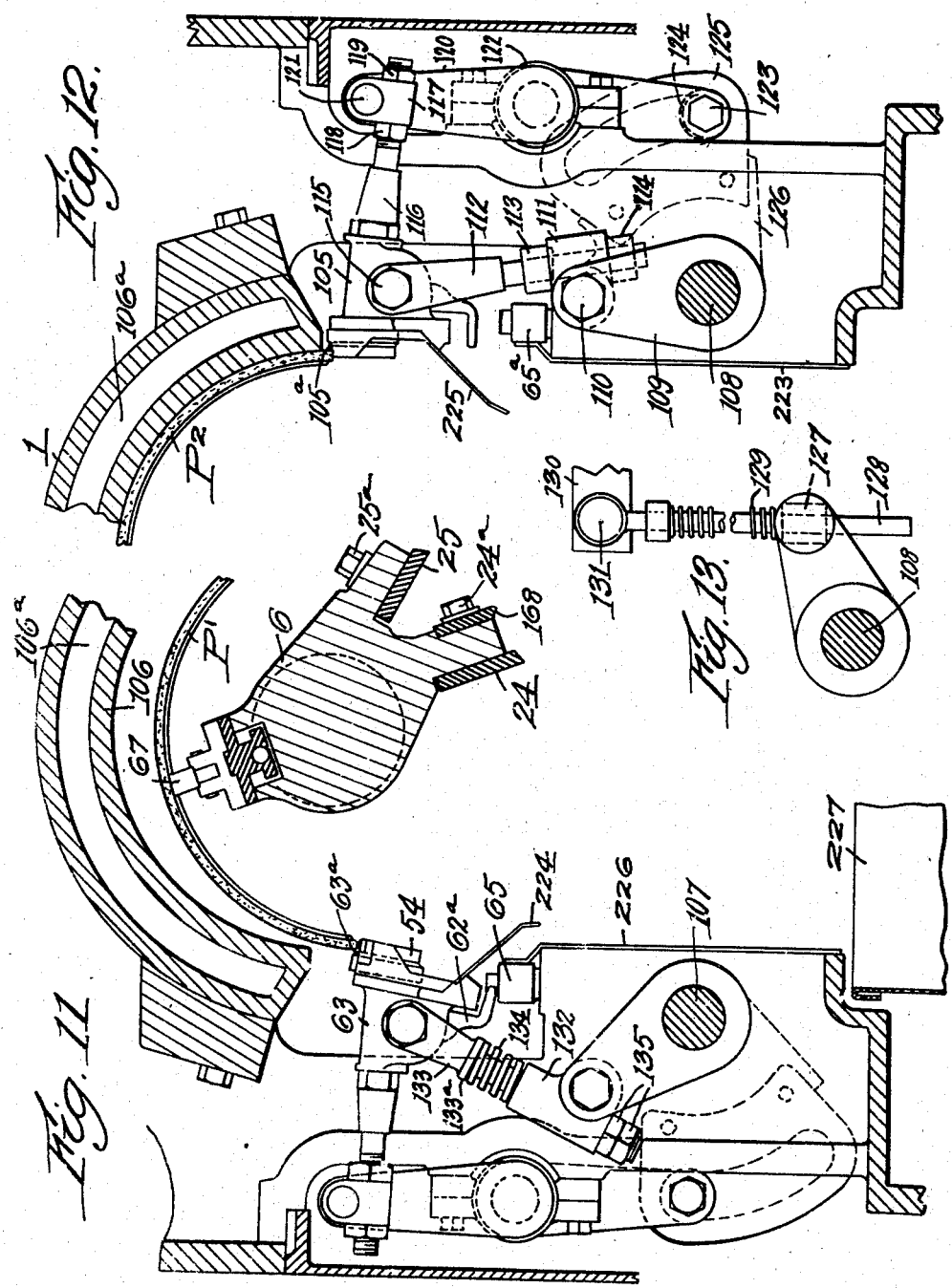

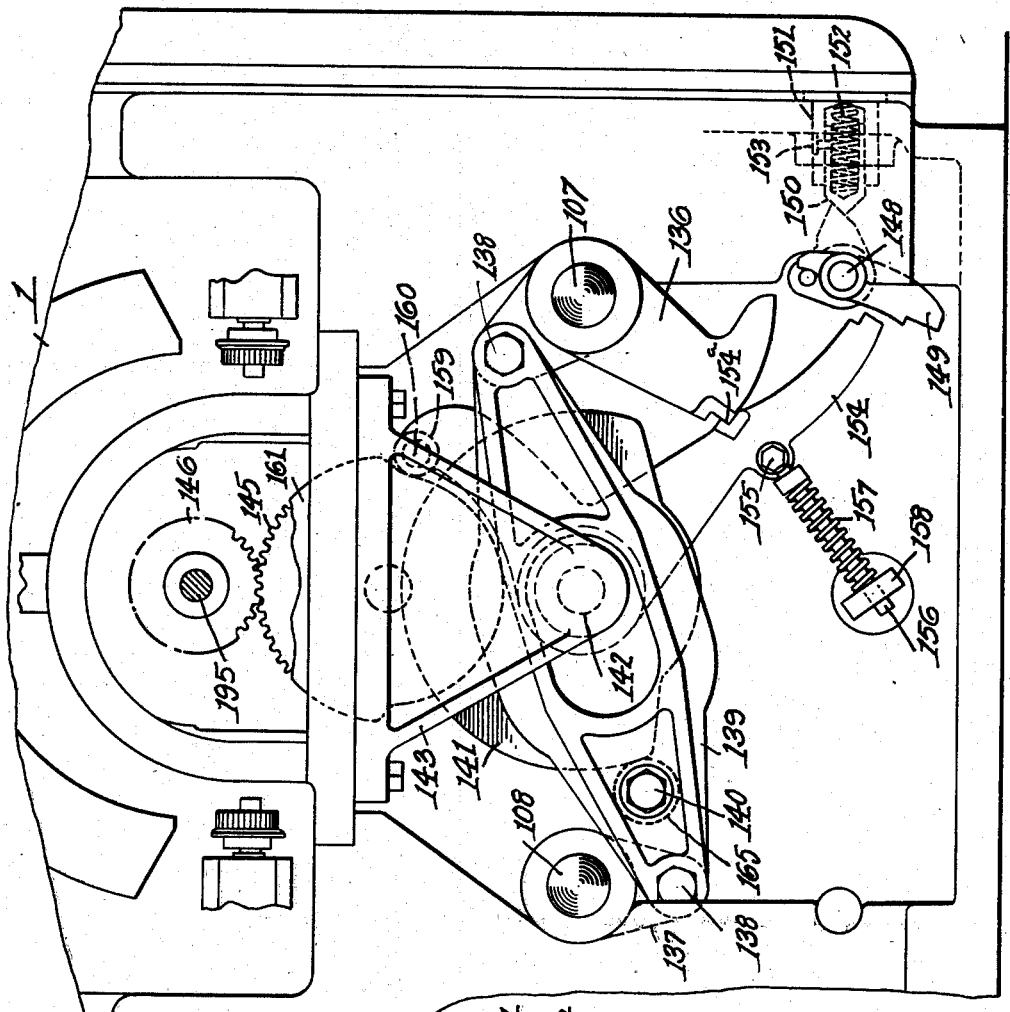
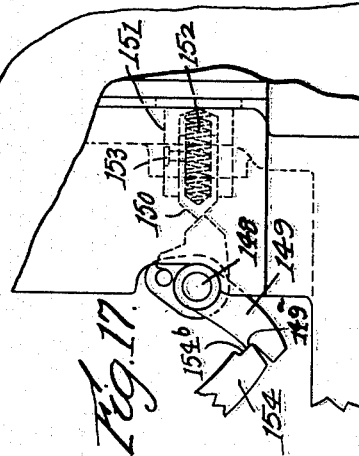

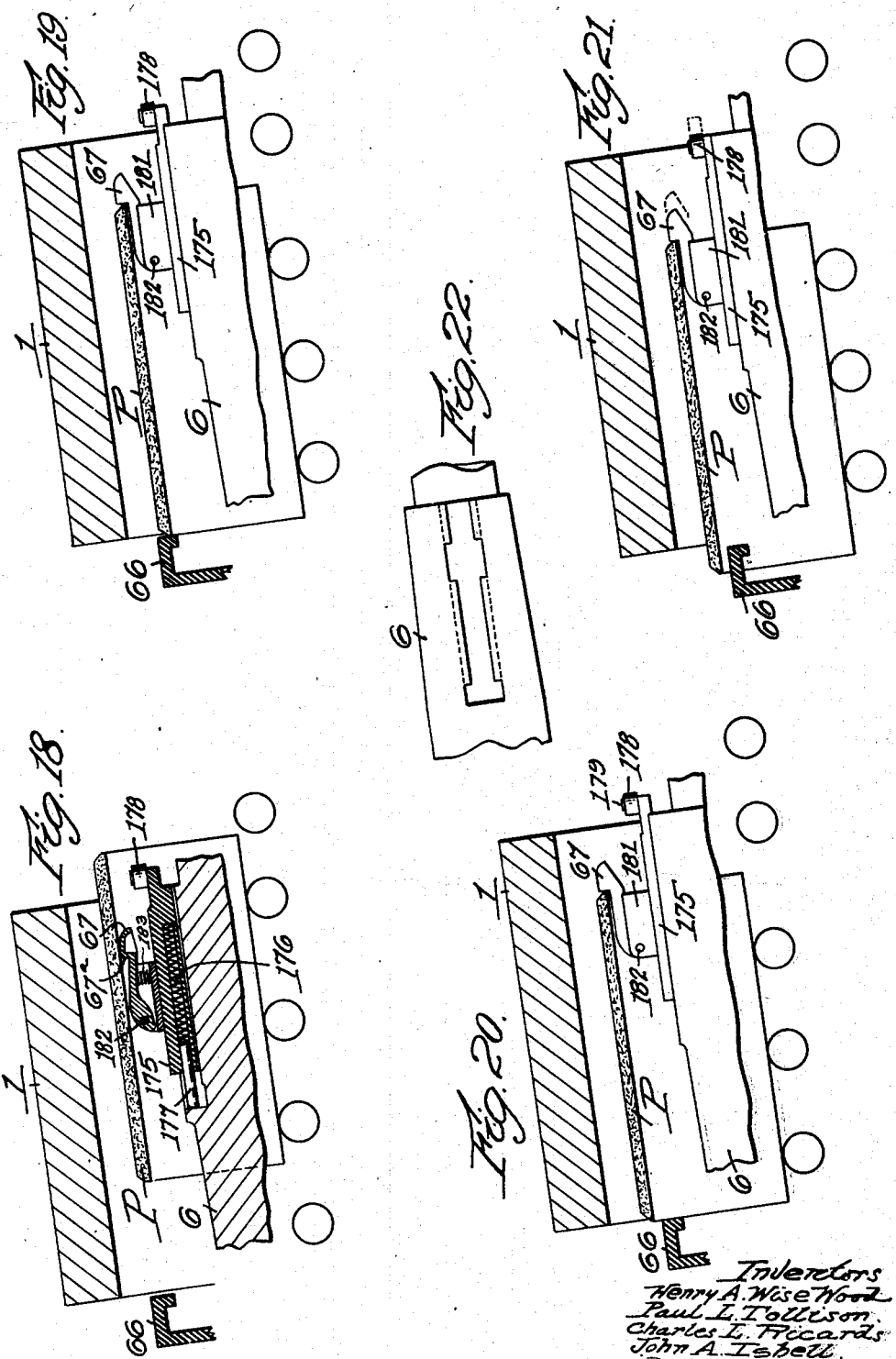

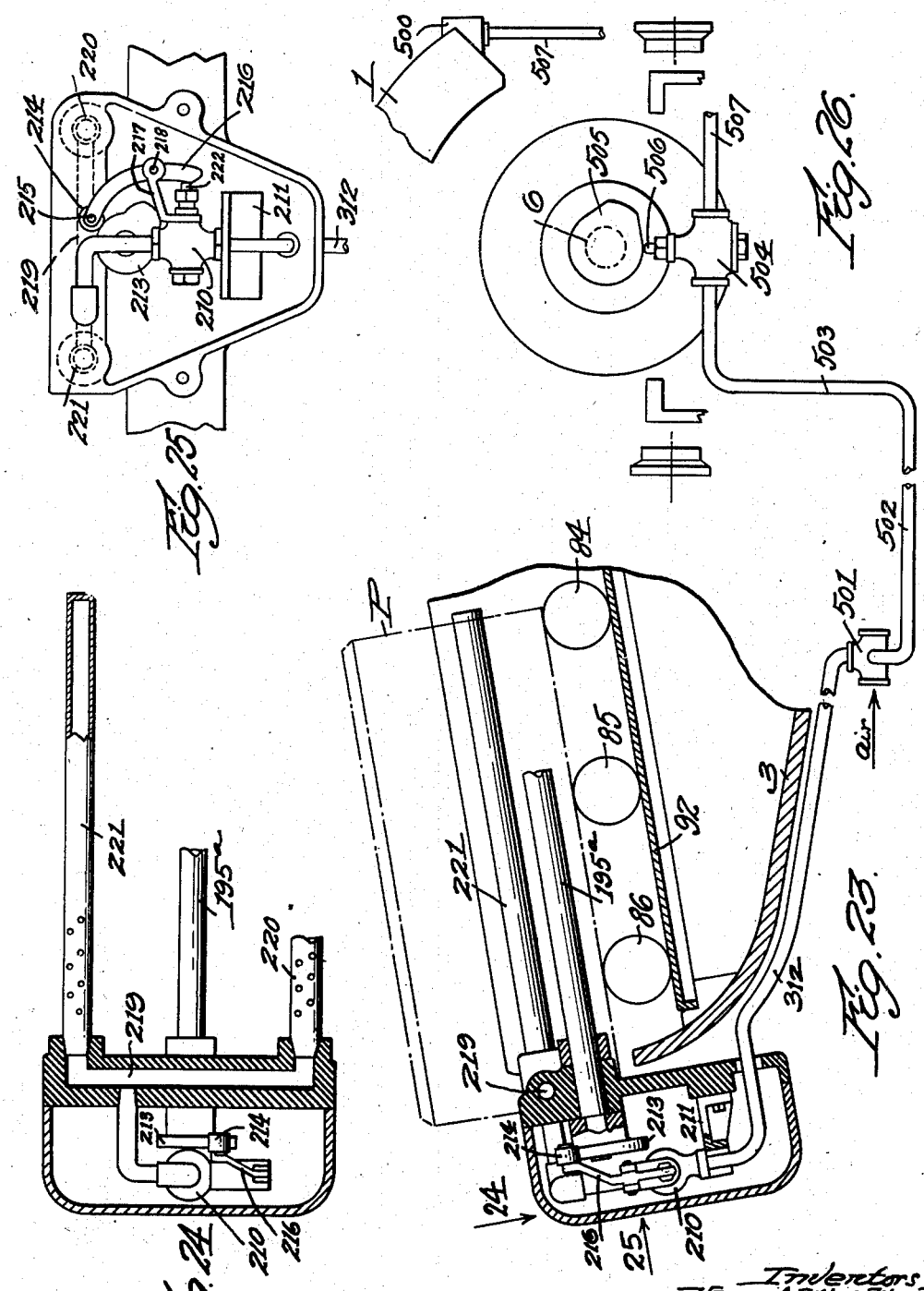

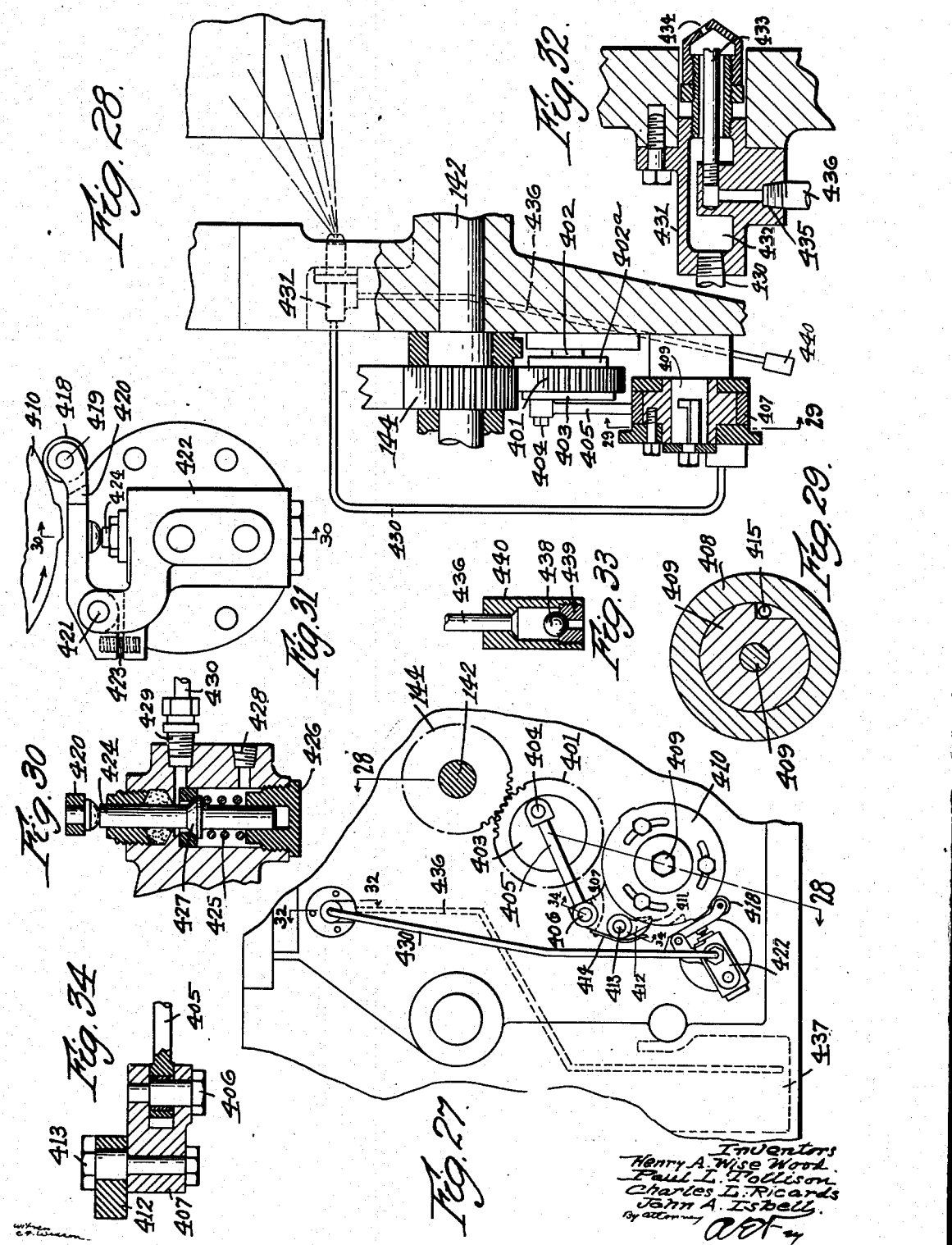

2,364,032

UNITED STATES PATENT OFFICE 2,364,032

PLATE FINISHING AND COOLING MACHINE

Henry A. Wise Wood, New York, N. Y., and Paul L. Tollison, North Plainfield, Charles L. Ricards, South Plainfield, and John A. Isbell, Plainfield, N. J.; Elizabeth Ogden Wood, executrix of Henry A. Wise Wood, deceased, assignors to Wood Newspaper Machinery Corporation, Plainfield, N. J., a corporation of Virginia Application January 17, 1939, Serial No. 251,322

5 Claims. (Cl. 29—21)

This invention deals with the type of stereotype plate finishing and cooling machine where printing plates, particularly stereotype plates, are shaved to the proper thickness, cooled and delivered, ready for placing on the printing press. The machine is provided with an inspection platform on which the plates are placed. After inspection they are allowed to pass into the machine where the concave surface of the semi-cylindrical plate is shaved and the beveled edges are trimmed.

The principal objects of this invention are to provide means whereby, as the plate enters the shaving arch, a blast of air is directed against the printing surface of the plate, to remove any chips or foreign matter which may injure the printing surface thereof; to provide for passing the plate on to a cooling tank where water may be directed on either or both sides of the plate; to provide for then passing the plate from the cooling tank over suitably arranged air pipes for blowing water off the inside of the plate before it is sent to the printing press; to provide means for directing a spray of atomized lubricant on the shaving knife or knives every few revolutions of the knife bar to keep the knife or knives free of chips and thereby minimize, or totally eliminate, the sticking of chips to the shaving knives or to the plate that is being finished, and to provide means as far as possible for shielding the rotary members for safety and to keep out chips and other foreign matter.

Other objects and advantages of the invention will appear hereinafter.

Reference is to be had to the accompanying drawings, in which

Fig. 1 is an elevation of a machine showing particularly the clamping mechanism and parts for controlling the speed of the plate down the incline;

Figs. 2 and 3 are longitudinal sectional views showing most of the principal parts of the machine;

Fig. 4 is a cross section on the line 4—4 of Fig. 2, showing a detail of the main drive gearing;

Fig. 5 is a section on the line 5—5 of Fig. 2, showing additional details of the main drive;

Fig. 6 is a plan view of the rollers on the receiving end of the machine;

Fig. 7 is a compressed view of the rollers underneath the shaving arch and showing their means of support;

Fig. 8 is an elevation looking in the direction of the arrow 8 in Fig. 7;

Fig. 9 is a plan view of the idler rolls for the plate as it passes out of the arch toward the cooling stand;

Fig. 10 is a sectional view of the rollers in the cooling tank;

Figs. 11 and 12 are cross sections on the line 11—12 of Fig. 1 and showing the clamping arrangement in its lowered position in Fig. 11 and in its raised position in Fig. 12;

Fig. 13 shows the spring mechanism which insures lowering of the plate clamps after finishing of the plate is completed;

Fig. 14 illustrates a mechanism for silencing the first plate stop when the double revolution feature is used;

Fig. 15 is a plan view of the mechanism used for turning on cooling water;

Fig. 16 is a cross section on the line 16—16 of Fig. 3 and illustrates the double revolution device;

Fig. 17 is a view similar to Fig. 16 showing the double revolution mechanism blocked out so that plates passing through the machine will be finished and delivered after each revolution of the knife bar;

Fig. 18 shows the plate entering the arch with the plate ejector depressed;

Fig. 19 shows the position as the plate strikes the second plate stop;

Fig. 20 shows the second plate stop depressed, permitting the plate to pass out from underneath the arch;

Fig. 21 shows the plate ejector giving a push to the plate as it passes out of the arch;

Fig. 22 is a detail view of the knife bar, illustrating the mounting provided to accommodate the plate ejector;

Fig. 23 is a sectional view of the delivery end of the machine showing devices for blowing water off the underneath part of the plate after cooling;

Fig. 24 is a view looking in the direction of the arrow 24 in Fig. 23;

Fig. 25 is a view looking in the direction of the arrow 25 in Fig. 23;

Fig. 26 is an elevation of a device for blowing chips off the surface of the plate as it passes into the arch;

Fig. 27 is an end view of part of the machine showing a device for spraying the shaving knives to prevent sticking of the chips;

Fig. 28 is a section on the line 28—28 of Fig. 27;

Fig. 29 is a section on the line 29—29 of Fig. 28;

Fig. 30 is a partial cross section of the air valve operating device;

Fig. 31 is an elevation of the same;

Fig. 32 is a section through the lines 32—32 of Fig. 27 showing the spraying nozzle;

Fig. 33 is a cross section of the unidirectional valve, and

Fig. 34 is a cross section on the line 34—34 of Fig. 27 illustrating the pawl mechanism.

The machine proper is divided into three main sections, each section being marked by a framing division. A main frame, which includes the shaving arch 1 and becomes the base for the entire machine, carries the major part of the operating mechanism to be described elsewhere. Said frame is made in one piece and machined at either end that it may accommodate, at its right hand end, a receiving, loading, and inspection platform 2 and, at its left hand end, a cooling stand and delivery bracket 3, as shown in Figs. 1 and 3. Between these there is as usual the shaving arch 1, which forms part of the frame, and a cooling arch 201.

Referring particularly to Figs. 2 and 3, taper bearings 4 and 5 rotatably mount a knife bar 6 concentrically with an arched portion of the main frame, forming the shaving arch 1. Said taper bearings are held in position by pillow blocks 7 and 8 respectively that are bolted to the main frame. The knife bar 6 derives its rotation from a motor 9 secured to the under portion of the loading platform 2, through a pinion 10 and a gear 11. This gear is mounted on a shaft 12 as best shown in Fig. 4. Referring also to Fig. 5, the shaft 12 has integral therewith a worm 13 which meshes with a worm wheel 14 carried by a shaft 15, said shaft being mounted on suitable ball bearings 16 and 17. Integral with the shaft 15 is a worm 18 meshing with a worm wheel 19, mounted on a barring hub sleeve 20. This worm is free to rotate on said sleeve but is connected thereto by a shear pin 21, Fig. 2. The barring hub sleeve 20 is secured to the knife bar shaft 6 by a key 22 and held in place by lock-nuts 23. In this manner rotation is provided for the knife bar 6. The worm wheel 19 and associated parts are protected by a casing 19a. These features are located under or near the loading platform 2.

The knife bar 6 now becomes the main drive shaft for this machine, as it will be shown that said shaft either has operating parts mounted thereon or, through intermediate parts, controls certain mechanisms. This is a desired feature in that all moving parts must be synchronized with knives 24 and 25 carried on the knife bar 6.

As previously explained, the plate to be finished traverses the machine at an angle to use gravitational pull. Suitable rollers have been arranged to accommodate the straight edges of the plate and guide it in its course to the various operating positions. These rollers are mounted on ball bearings and some of them are free to turn, as will be described. Other rollers are driven at a speed calculated to set the plate at various machine positions at the proper time. The rollers will carry the plate through the machine where said plate's progress will be controlled by various stops actuated from the knife bar, which will either prevent further motion of the plate, or allow it to pass on as the particular time in the operating cycle will permit.

Referring to Figs. 1, 3, 6, 7, 8, 9 and 10, for the sake of convenience, the plate rollers will be divided into various groupings:

Group a: Those rollers between the inspection platform and the arch.

Group b: Those rollers completely within the arch.

Group c: Those rollers between the arch and the cooling tank.

Group d: The remaining rollers.

The rollers in group a, shown in Figs. 1 and 6, located between the loading platform 2 and the shaving arch 1, are mounted in pairs on either side of the knife bar 6. They locate the plate P centrally with respect to the machine all along the course of plate travel. The description of rollers on one side of the knife bar will suffice for both sides. A roller 26 is mounted so that its top side is tangent to a guide channel 2b in the receiving platform 2. Referring to Fig. 1, the roller 26 is carried by ball bearings on a stud 27 mounted in a bracket 28 adjustably bolted to the platform 2.

Continuing along the angle of machine operation, the plate approaches a roller 29, Fig. 6, mounted by ball bearings on an eccentric stud 30 secured in a bracket 31. An eccentric stud 32 supports a roller 33 in a similar manner. The bracket 31 is bolted to the bracket 2 and eccentric studs mounted therein are adjustable for various size plates. The rollers 26, 29 and 33 are free turning and allow the plate to proceed until it abuts a stop 34, Fig. 2, to be described in detail later. The depressing of said stop will allow the plate to proceed until it is intercepted by a driven roller 35 and has its speed controlled thereby. The roller 35 derives its motion from the same source as the knife bar 6.

Referring to Figs. 1 and 5, the shaft 15 has secured to it, one at each end, spiral gears 36, which will operate the driving or hold back rollers of the left hand and right hand side of the machine respectively. Referring to the left hand side only, one spiral gear 36 meshes with an intermediate gear 38 that is mounted by ball bearings on a stud 39 secured in the bracket 31. Said intermediate gear meshes with a gear 40 secured to one end of a shaft 41 which is rotatably mounted in the same bracket 31 by suitable bearings 42 and 43. The shaft 41, which is parallel to the knife bar 6, has secured on its opposite end, a spiral gear 44 and shaft coupling 45. Said coupling transmits drive through a shaft 46 to the driving roller in group c, to be described later.

The spiral gear 44 meshes with an intermediate gear 47 which is carried by ball bearings on a stud 48 secured in the frame. The stud 48 pivotally mounts a bracket 49 so that a gear 50 secured to a shaft 51, rotatably mounted by suitable ball bearings in said bracket 49, may stay in mesh with the intermediate gear 47 and provide the drive for the roller 35 fastened to the shaft 51, regardless of the roller's position, to accommodate various plate sizes. The bracket 49 is secured in position by a screw passing through a slot 49a and tapped into the frame. The periphery of the roller 35 is notched to provide a friction surface against the plate edge. The roller 35 permits the plate to move forward under the shaving arch at a controlled speed where it is guided by group b rollers, in this arch 1.

With the exception of a roller 52 on the left hand side of the machine, as viewed from the receiving end, all rollers in group b are mounted in the same manner. With particular reference to Figs. 7 and 8, it is shown that an eccentric stud 53 secured in the frame carries the roller 52 by means of ball bearings. Rollers 54, 55 and 56 on the left hand side of the machine, and rollers 57, 58, 59 and 60 on the right hand side of the machine, are mounted in a similar manner. Referring solely to the roller 54, as an example, Fig. 7 shows that it is carried by a ball bearing on a stud 61 which is secured in a pivoted bracket 62. Said bracket is secured to a lifting bar 63, to be described later, by a hinge stud 64. The bracket 62 has integral with it a toe 62a that will come in contact with a bar 65 when the lifter bar 63 is at its lowest point. This is best shown in the left hand side of Fig. 11. The lifter bar 63 is at this low point when the shaving arch is ready to receive a plate P or when the plate has just been lowered from the arch. In this position of the lifter bar, the toe 62a on the hinge bracket will cause the upper edge of the roller 54 to rise above the top edge of the lifter bar 63. With other rollers in group b these are the sole carriers for the plate. As the lifter bar 63 rises, the toe 62a will draw away from the bar 65 and will allow the roller 54 to drop below the lifter bar surface and transfer the plate to the lifter bar 63 to be raised and clamped in the arch. This construction provides a firm support as the plate is being finished.

The rollers in group b, being freely mounted, allow the plate to move down through the machine until held by the second plate stop 66, which places said plate completely underneath the arch. After the plate is clamped in the shaving arch and the curved ribs and ends of the plate finished, the plate is lowered, as will be described below. The depressing of the stop 66 will allow the plate to proceed. If the rollers do not act immediately, an ejector 67 described later, pushes the plate along where it is picked up by group c rollers beyond the shaving arch, as shown in Figs. 3 and 9. Rollers 68 and 69 are mounted similarly to eccentric studs 70 and 71 respectively by ball bearings. Said studs are supported in a bracket 72 bolted to the frame. The bracket 72 mounts, by suitable ball bearings 76 and 77, a shaft 73, which is connected to the shaft 46 by a coupling 74. A spiral gear 75 keyed to the shaft 73 operates a drive roller 78 in the same manner that the gear 44 drives the roller 35.

A roller 78 will permit the plate to move from the cooling arch 201 into the cooling tank 79 from which point the group d rollers will guide the plate. Figs. 3 and 10 show rollers 80, 81, 82, 83, 84, 85 and 86 which are all mounted in an identical manner. With particular reference to Fig. 10, the roller 82, which will serve to describe all rollers in group d, is mounted to an eccentric stud 87 by ball bearings. Said stud is secured in a bracket 89 which is bolted to the delivery-and-cooling-tank end 3. A set screw 89a secures the roller in proper position for any particular plate size.

Wherever possible in group d, roller materials that resist corrosion have been used to counteract the effects of water or moisture which is constantly present in the cooling tank end of the machine.

Rollers 80, 81, 82 and 83 are entirely within the cooling tank, mounted there by brackets 88 and 89. It is understood, of course, that a similar set of rollers support and guide the other side of the plate. Said rollers will guide the plate to the third plate stop 90 which will locate said plate for cooling operation. Said stop is operated by a cam 91 which causes the stop 90 to release the plate P at the same time as the second stop 66 releases a succeeding plate from the arch. The plate, leaving the tank, will continue along the rollers 84, 85 and 86 supported by a bracket 92 bolted to the bracket 3 until it passes on to a conveyor, which is quite frequently used, or is halted by a stop, not shown, from which point it is manually removed.

From the description it is apparent that rollers guide the plate in traversing the machine and the angle of operation causes gravity to do this successfully.

The plate, on being moved from the receiving platform 2 to the plate rollers, is first brought in to contact with the first plate stop 34 which remains in contact with said plate until conditions within the shaving arch are favorable to receive it. A cam 93, Fig. 2, which is secured to the knife shaft 6 causes the stop 34 to operate. When the high spot on said cam contacts a roller 94 on a stud 95 secured in a slide 96, said slide will be forced against a spring 97 held in the slide 96 by a counter-bored hole and abutting stop 34.

To operate the stop 34, the cam 93 must co-operate with a cam 98, Fig. 14, that is controlled by a second shave mechanism described elsewhere. The cam 98 will cause the stop 34 to be maintained in raised position in opposition to the action of the cam 93, or will allow the cam 93 to operate said stop.

A lever 99 is operated by a pin 100 working in conjunction with the cam 98. The high point of said cam will cause the lever 99 to be rotated about a stud 101 carried in the frame in such manner that one arm 99a is held against the stop 34 and secures it in raised position. When the stop is held in this manner, action of the cam 93 against the roller 94 causes the slide 96 to move downward against the spring 97. Since the stop 34 is secured in a raised position, the action of the cam 93 will merely cause the spring 97 to be compressed against said stop with no resulting motion thereof. A spring 102 carried by a spring rod 103 which is held by a stud 104 in the frame, operates against the lever 99 in such manner that when the cams 93 and 98 release pressure on said stop, the spring 102 will hold it in its high position.

At the completion of the shaving operation, in the double or single shave cycle, the plate will be lowered from the arch and be moved therefrom. The cam 98 will be rotated releasing the lever 99 and allowing the cam 93 to operate the stop 34. The cam 93 will work against the roller 94 and cause the slide 96 to move against the spring 97. The spring 97, which is much stronger than the spring 102, will force the stop 34 downward against the lever 99 and compress the spring 102. Upon rotation of the cam 93, past the roller 94, the spring 102 will move the stop 34 up to its high position.

The plate will now be moved into the arched opening in the frame until it abuts the second plate stop 66. At this location, lifting bars 63 and 105 will engage the straight parallel edges of the plate and will raise said plate from position P—1 to position P—2 against an arch liner 106 shown in Figs. 11 and 12. The concave surface of said liner is finished to a dimension that will insure the proper plate curvature when the plate ribs are machined. Said concave surface of the arch engages the printing face of the stereotype plate and holds said plate exactly concentric with the knife bar axis so that the knife blades 24 and 25, after completing their cuts, will leave a plate of exact thickness throughout. A water jacket 106a is cast integral with said liner and water circulating through it assists in cooling the plate. Water supply piping is well-known in the art, and, therefore, is not shown. The liner 106 is provided in arch portion to provide an accurate finishing base and provide a simple means for altering the machine for various printing diameters.

The knives 24 and 25 are provided with adjusting screws so that the desired depth of cut with each knife may be obtained. Clamp screws 24a and 25a lock the knives securely to the knife bar 6.

After a plate has been cast, the cooling action may cause it to flatten so that it does not fit the liner accurately. If the plate is forced to shape itself to the contour of the liner by pushing it into position, the type at the edges of the plate would be crushed. Means are provided for closing or pinching in the edges of the plate as it is raised into the arch to prevent damage.

The plate lifter bars 63 and 105 each have machined thereon a ledge 63a and 105a, shown best in Fig. 7, which engage the outside surface of the plate on the dead metal between the type and the plate edge. As the plate is raised toward the arch, the lifter bars will move inward, pinching the plate slightly and allowing the edges to pass in without striking the arch liner. When the plate is at the highest point, the lifter bars 63 and 105 will move away from the dead metal, allowing the plate to spring outward and assume the correct arch radius.

Plate lifting mechanism, best shown in Figs. 11 and 12, is operated by a shaft 107 operating in a clockwise manner and a shaft 108 operating in a counter-clockwise manner. Said shafts are on the right and left-hand side of the machine respectively and control the lifting mechanism attached in a similar manner except for shaft rotation and certain parts.

Mechanism of a shaft 108 may be called the positive clamp or lifter arrangement, as it holds the plate P in position against the action of the knife blades 24 and 25. Rotation of the shaft 108 moves a lever 109 in an arcuate manner, carrying at its outer end a stud 110, to which is connected a trunnion 111. Said trunnion has passing through it a threaded shank of lifter rod 112, said lifter rod being held in adjustment therein by lock nuts 113 and 114. The upper end of the lifter rod 112 is pivotally secured to the lifter bar 105 by a hinge pin 115. Referring to Fig. 7 we see that lifter rod arrangement is in duplicate shown at 112 and 112a.

Referring to Fig. 12, a stud 116 is secured in the lifter bar 105 and has a threaded shank passing through a trunnion 117. Adjusting nuts 118 and 119 secure said trunnion, which is pivotally mounted, to the end of a pinching fork lever 120 by a stud 121. The arrangement of the stud 116 is likewise in duplicate as shown in Fig. 11.

The pinching fork lever 120 is carried in bearings 122 mounted on the frame which acts as said lever's fulcrum. The fork lever 120 has positioned in one arm a stud 123 mounting a roller 124 which is accommodated by a cam groove in a cam 125. Said cam is supported by a lever 126 which also has mounted therein a poppet 127, see Fig. 13. The lever 126 is secured to the shaft 108 and rotation of said shaft will cause the cam 125 to operate the fork lever 120 and control the motion of the lifter bar 105 as it raises or lowers the plate.

Referring to Fig. 13, the poppet 127 accommodates a spring rod 128 which carries a spring 129. Said spring rod is secured to a bracket 130 by a hinge stud 131. The bracket 130 is bolted to the frame 1. The spring 129 causes the plate lifter 105 to be returned to lowered position.

The arrangement of the lifter bar mechanism mounted on the shaft 107 is of similar construction and operation except for a lifter rod 133 passing through a trunnion 132 carrying thereon a spring 134 which produces the locking force for the left-hand locking mechanism in Fig. 11. The spring 134 is compressed between a shoulder 133a on the lifter rod and the trunnion 132 and is adjusted by locknuts 135. This insures clamping of the plate regardless of slight variations in the circumferential length of the plate. As stated before, the remaining mechanism functions similarly to the mechanism on the shaft 108. This mechanism is located in the shaving arch 1.

The shafts 107 and 108 derive their oscillation from the knife shaft 6, which, through gearing, operates the cams and levers to control motion in the following manner. Referring particularly to Fig. 16, a lever 136 is secured to the shaft 107 and a lever 137 is fastened to the shaft 108. Said levers move in an arcuate manner about the axes of their respective shafts and, as shown above in Fig. 16 which, being viewed from the other end, is substantially the opposite of Figs. 11 and 12 in regard to the lifter shafts, the shaft 107 will rotate counterclockwise for lifting and shaft 108 will move clockwise. Carried at the extremities of the levers 136 and 137 by studs 138 is a lifter yoke 139 that has mounted therein a stud 140 carrying a roller 165. Said roller is held in contact with the cam 141 by springs 129 previously described. The cam 141 is rotatably mounted on the stud shaft 142 which is secured in the frame 1 and supported at its outer end by the bracket 143. (See Figs. 3 and 16.) The bracket 143 acts as a thrust bearing for the cam 141. Fastened to the hub of the cam 141 is a gear 144 which derives its motion from an intermediate gear 145 operated by a pinion 146 secured to the knife shaft 6. The gears 144 and 146 have an equal number of teeth and will therefore rotate at the same speed. Consequently the cam 141 will rotate once to each rotation of the knife bar. Unless the machine is set for the double shave cycle, the cam 141 will cause the plate lifters to be raised and lowered once for each knife bar revolution. If the machine is set for double shave cycle, the cam 141 will still operate, but mechanism yet to be described will permit the cam to control the lifting mechanism only every other revolution of the knife bar. These parts are shielded by a plate 146a.

The movement of the cam 141 against the roller 140 will cause the yoke 139 to oscillate back and forth, thereby regulating the raising or lowering of the lifter bars.

As has been stated previously, it is desirable sometimes to take an additional finishing cut to produce accurate results, as the plate may spring or bulge on the first passage of the knife and leave an inaccurate surface; the second knife passage would remove any uneven spot. This is accomplished by simply throwing the lever 147 attached to one end of the shaft 148, placed in a convenient position near the loading end of the machine. The shaft 148 extends longitudinally through the machine and has secured at its opposite end a trip lever 149 which is maintained in the desired operating position by a trip detent 150. The trip detent 150 is carried in the frame 1 by a bushing 151. A spring 152 mounted therein forces the detent 150 against the trip lever 149. A screw 153, cooperating with a slot in the detent 150, controls the longitudinal motion thereof.

As illustrated in Fig. 16, the mechanism is set for double shave operation, as shown and described in the application of Oscar C. Roesen, filed December 17, 1938, Serial No. 246,325, now Patent No. 2,243,261, granted May 27, 1941. Lever 149, in rotating about center of shaft 148, is in line of contact with a lever 154 rotatably mounted on the shaft 142. A stud 155, carried in one arm of said lever 154, secures thereon a spring rod 156 mounting a spring 157. The shank of the spring rod 156 passes through a poppet 158, bolted to the frame 1, the spring 157 abutting against said poppet. Spring action will urge the lever 154 to rotate and carry a roller 159, secured to another arm of said lever by a stud 160, to move against a cam 161 which is attached to the intermediate gear 145. Suitable ball bearings mount said gear to a stud shaft 162 that is bolted to the frame 1.

The gear 145 has twice as many teeth as either gear 144 or 146 and will make one revolution to two revolutions of the knife bar. Therefore, the cam 161 will make one revolution to two knife bar revolutions. As a result, the cam 161 causes the lever 154 to oscillate back and forth in such manner as to engage the lever 136 at 154a once to every two knife bar revolutions and to maintain it in locked position for the second revolution. After the second shaving operation is finished, the cam 161 is brought into such position that the roller 159 causes the lever 154 to be rotated and to release the lever 136. The cam 141 is constructed to accommodate a roller 165 and control its motion and consequently the motion of the levers 136 and 137, when the lever 136 is released by the lever 154, the cam 141 will cause the lifters to lower the plates from the arch. It is, therefore, evident that, by means of mechanism described above, the plate lifting mechanism will raise the plate into the shaving arch for machining, hold the plate therein, while the knife bar 6 rotates the blades 24 and 25 to trim off the ribs, and for the double shave cycle continue to hold said plate in position for another knife bar rotation before the plate is lowered from the arch.

Fig. 17 illustrates the position of the trip lever 149 for the single shave cycle. Said lever 149, operated through the shaft 148 by the handle 147, is brought in contact with the lever 154 in such manner that a toe 154b is brought into contact with a ledge 149a and holds the lever 154 clear of the lever 136. The cam 141 will, therefore, have complete control of the levers 136 and 137 and will operate the plate lifter so that a plate is raised into the arch, clamped for the finishing operation and lowered once every knife bar revolution.

The plate upon being secured against the liner, as shown at P—2 in Fig. 12, is now ready to be machined. Rotation of the knife bar 6 will cause the blades 24 and 25 to be brought against the inside face of the plate and remove the required amount of metal to secure proper plate thickness. The blades 24 and 25 are radially adjustable by means of adjusting screws 166 and adjusting fingers 167 placed at either end of said blades. Suitable screws 24a and 25a clamp the blades to the knife bar 6. Trimming tools 168 and 169, shown in Figs. 2 and 3, remove metal from the curved beveled edges of the plate, eliminating any sharp or rough edges left there in the plate casting or tail cutting operations. Said trimming tools are attached to the knife bar in such position as to accommodate the ends of the plate. Fig. 11 shows them as being clamped to the trailing side of the projection carrying knife 24.

When the plate is rolled underneath the arch, it is intercepted by the stop 66. Said stop will set the plate in such position that the trimming tools 168 and 169 trim the edges properly. The stop 66 is controlled by a cam groove in a cam 170, see Fig. 3. Cam 170, fastened to the knife bar 6, synchronizes the action of the stop 66 with the plate lifters and trimming tools. The stop 66 abuts the beveled edge of the plate. As the plate lifters carry said plate upward, the cam 170 permits the stop 66 to be raised by spring action against a roller 171. This roller is mounted on a stud 172 carried in the stop 66 and causes the stop to maintain the longitudinal position of the plate. A spring 173 secured to a stud 174 in the plate stop assists the cam action by keeping the roller 171 in contact with the cam 170. Said stop is held in the raised position as the knife bar 6 is being rotated. The trimming tool 168 will finish the edge of plate abutting the stop 66 and the cam 170 will cause the stop 66 to descend, clearing said tool, then assume its raised position. After the finishing operation, the stop will descend with the plate, thereby maintaining the plate's location until the lifter bars reach their lowest position. At this point the plate stops its descending motion, but the stop 66 continues downward until clear of the plate, at which time the ejector 67 is brought into action and pushes the plate from the arch 1.

The ejector forms a twofold purpose, its main function being to start the plate moving from the arch, when the rollers within the arch prove sluggish and the second function being to prevent the plate from rebounding off the second plate stop.

Substantially 180° away from the shaving knives 24 and 25, as shown in Fig. 11, the plate ejector 67 is mounted as follows: A T slot is machined in the knife bar 6 with certain portions of the overhanging ledges cut away, substantially as shown in Fig. 22. A slide bar 175 is also made on its lower portion in the shape of a T with cutouts complementary with those in the knife bar 6. This permits this slide bar to be inserted into the T slot and moved in a longitudinal direction, thereby securing it against radial motion but permitting longitudinal motion. As shown in Fig. 2, the slide bar 175 is counterbored to accommodate a spring 176. In the end of the hole a rod 177 is placed abutting one end of the spring and a shoulder in the knife bar 6. The cooperation of this rod 177 and a spring 176 tends to force the slide bar 175 to the right, as shown in Fig. 2, pushing a roller 178 carried by a stud 179 secured in the sliding bar 175 against a shoulder of the cam 93. In this manner the stop is kept in the location shown in Figs. 2, 18, 19 and 20. When the rotation of the knife bar brings the roller 178 around to the position shown in Fig. 11, the slide bar 175 is pushed to the left of the position shown in Fig. 2. This is caused by a high part of a stationary cam 180, see Fig. 2. Secured to the slide bar 175 is a bracket 181 on which the plate ejector 67 is pivotally mounted by a pin 182. This plate ejector is urged upwardly by a spring 183. Its upward motion is limited by contact with a bracket 181. A shoulder 67a of the plate ejector 67 contacts the plate P under the following conditions: A plate upon being released by the stop 34 passes along the rollers until it contacts the ejector 67. Said ejector will be forced downward compressing a spring 183, and allow the plate to pass over it. See Fig. 18. Immediately after the trailing edge of plate passes beyond the shoulder 67a, the ejector 67 will snap up behind the trailing end of the plate, thereby preventing rebound. See Fig. 19.

It is understood that the stop 66 is to cooperate with the ejector 67 in that it allows clear passage of the plate when the ejector causes it to move to the left.

The plate is now projected into the cooling tank 79 wherein a spray of water may be directed against either or both sides of the plate by selecting valves, not shown.

The plate contacts two rollers 184 carried by studs 185 each secured in one end of a lever 186, Figs. 3 and 15. The weight of the plate will cause the levers 186 to begin rotation about the axis of a shaft 187 to which they are attached and also cause a lever 188 to be moved about the same axis. As shown in Fig. 3, the lever 188 is secured to the shaft 187, which is mounted in a bracket 205, bolted to the bracket 3. The counter-clockwise motion will cause a hinge pin 204, secured in one end of the lever 188, to move to the right, carrying with it one end of a connecting link 189 whose other end is attached to valve 190 shown in Fig. 1.

A shut-off valve 191 is connected to a water supply by piping, not shown, and is also connected to the release valve 190 and the water jacket of the arch liner 106 by piping which is not shown. The operation of the valve 190 releases water to a manifold 192 and a cooling stand 193, see Fig. 3, through piping, not shown. The manifold 192 accommodates a plurality of spray pipes 194 parallel to the plate surface and in such position that suitable holes in said spray pipes will direct jets of water against the entire outside surface of the plate at once. The cooling stand 193 carries thereon a spray plate 193a in which suitable holes are drilled to direct the water against the concave surface of the plate. These features are located in the cooling arch 201.

During the cooling operation, the plate is located by the hinged stop 90 operated by the cam 91. The cam 91 is attached to a knife bar extension 195, which operates concentrically with the knife bar 6 to which it is secured. The rotation of the knife bar 6, therefore, will cause the cam 91 to rotate and intercept a roller 196 secured to the stop 90 by a stud 197. A projection on the face of the cam 91 will move the cam in a clockwise manner about a hinge pin 198 secured in a bracket 199 that in turn is bolted to the end of the cooling stand 193 as shown in Fig. 3. The stop 90 is also provided with a handle 90a through which said stop may be manually operated. The handle 90a serves as a counterweight to keep the operating end of the stop normally in the raised position. Lowering of the stop 90 will release the plate and allow said plate to pass over the stop 90 into delivery position. The removal of the plate from the cooling tank 79 will relieve the weight from the valve operating mechanism and cause a weight 200, slidably mounted on the lever 188, to turn the valve mechanism in a clockwise manner and shut off the water supply to the cooling tank. The tank cover 201 confines the spray within the tank and directs it into the base of the bracket 3, where a strainer 202 prevents chips from passing into a drain 203.

The plate, after leaving the cooling tank 79, has an accumulation of water on its inner surface which, if allowed to remain, would be picked up by the printing press cylinders and would cause corrosion, especially to those parts incorporated in a locking arrangement. Water on the outside surface would be quickly dispelled as the press is put in operation. A drying arrangement mounted in the delivery end bracket is designed to remove water from the inside surface of the plate by the use of compressed air.

Referring to Fig. 23, an air inlet 501 is connected to an air valve 210 mounted at the end of the delivery bracket 3 by a bracket 211 through piping and fittings 312. The air valve is operated from the knife bar 6 through double extension shafts 195 and 195a. The extension shaft 195a passes through the delivery end bracket 3 which becomes a bearing for said shaft and carries a valve operating cam 213 at its outer end.

The rotation of said cam will cause its high point to operate a roller 214 carried by a stud 215 in a lever 216. Said lever is pivotally mounted in a bracket 217 by a pin 218 and is brought into contact with a pin 222 of the valve 210. Depressing the pin 222 will release the air to a manifold 219 to be carried through exhaust pipes 220 and 221. Suitable holes are drilled in said pipes to direct air against the plates concave surface and blow off and evaporate water which eventually runs out through the drain 203. It is understood that the cam 213 is timed so that air is blown out through the pipes 220 and 221 only when, in the cycle of the machine, a plate is scheduled to be over them.

To minimize the danger of any foreign matter adhering to the outside of the plate and then having it crushed into the plate when said plate is forced against the shaving arch, there is incorporated in this machine a plate cleaner which by means of compressed air will remove any loose substance from the plate as said plate is entering the arch. A manifold 500, see Fig. 26, arranged to coincide with entering end of the shaving arch contains air outlets designed to blow against the plate P as it moves into the arch. The air supply is controlled from the knife bar.

Air is brought in through fitting 501, see Fig. 23, then through air lines 502 and 503 to an air valve 504. A cam 505, secured to the upper end of the shaving knife bar 6, is arranged in such manner that its high point will be brought against a pin 506 of the air valve, depressing said pin and releasing air pressure through a pipe line 507 and its fittings, in to manifold 500 and then exhausting against the plate P. The valve 504 is mounted in a bracket which in turn is bolted to the receiving bracket 2. The air blast through the small holes of the manifold 500 is so controlled that it blows only as the plate passes underneath on its course longitudinally into the arch.

The shaving knife lubricator makes use of air pressure to produce a vacuum in the oil supply line, thereby siphoning the oil from its reservoir, and to atomize the oil when it is ejected to the atmosphere. The air passing the opening in the supply line will reduce the pressure therein and cause atmospheric pressure to force the lubricant through the supply line from the reservoir. Moving parts in the lubricator are operated from the knife bar and air pressure is supplied from an outside source.

Referring to Figs. 27 and 28, gear 401 which meshes with the gear 144 is rotatably mounted on a stud 402 by a bearing 402a and is secured to said bearing by a retainer 403. A crank pin 404, fastened in the retainer 403, carries one end of a crank 405 whose other end is carried by a crank pin 406 secured in a cam index yoke 407. Said yoke is free to rotate on a hub 408 but its motion is limited by the crank 405. The operating radius of the pin 404 is shorter than that of the pin 406, and when the machine is in operation, rotation of the retainer 403 will cause the crank 405 to transmit an oscillating motion to the yoke 407. The hub 408 is rotatably mounted on a shaft 409 and has secured to it a ratchet 411 and a lubricator operating cam 410. A ratchet pawl 412, pivotally mounted in the yoke 407 by a stud 413, is held against the ratchet 411 by a spring 414. The oscillating motion of the yoke 407 causes the pawl 412 to engage and disengage with a series of notches on the ratchet 411, to move the ratchet 411, and consequently the hub 408 and cam 410 about the shaft 409. The hub 408 can be moved positively in one direction only.

In referring to Fig. 29, a roller 415 is shown against the inside of the hub 408 and flat on the shaft 409 in such manner that clockwise motion of the hub 408 will cause the roller 415 to be wedged between said hub and flat of the shaft 409, thereby limiting the motion of the hub 408 to one direction. Movement of said hub in counter-clockwise manner will allow free motion.

Rotation of the cam 410 will bring the high point thereon in contact with a roller 418 carried by a pin 419 in a lever 420, as shown in Fig. 31. The lever 420 is mounted on an air valve body 422 by a hinge pin 421 and a spring 423, mounted in counterbored holes in both levers and body, holds the lever against a spindle 424. The spindle 424 is held in place against a seat 427 by a spring 425 and an adjustable check screw 426, as shown in Fig. 30. When a shoulder of the spindle 424 is held against its seat 427, it will form an effective seal for air entering at 428. The action of the cam 410 against the roller 418 will cause the spindle 424 to be freed from the seat and release air through an exhaust port 429 through a tube 430 to an air nozzle body 431, shown in Fig. 32. Air will be admitted at 432 and will pass around a tube 433 and will exhaust through a nozzle 434. In passing the tube 433, the air will produce a vacuum therein, causing lubricant to be drawn into the nozzle body 431 through a fitting at 435, through the tube 433, then through the nozzle 434, where it is atomized. Referring to Figs. 27 and 28, the oil supply pipe 436 is connected to the nozzle body 431 at the opening 435 and extends into a reservoir 437 cast in the main frame 1.

As noted in Fig. 27, the high points on the cam 410 are substantially 180° apart, indicating that lubricating action is intermittent. The cam 410 is adjustable so that lubrication can be made to take place at the proper time.

For proper lubricator action it is necessary that the supply pipe 436 contain oil at all times. When the air pressure is cut off in the nozzle body 431, oil is maintained in said supply pipe by a ball valve 438, which is drawn up by vacuum, allowing the lubricant to enter through the opening in a check nut 439. But the ball 438 drops down by gravity when the vacuum is broken, thus sealing the opening in the nut 439 and trapping oil in the supply line 436 and ball valve body 440; see Fig. 33. This knife lubrication is an improvement on the construction shown and claimed in the pending application of Norman M. Shaner and William B. Bardell, Serial No. 228,338, filed September 3, 1938, now Patent No. 2,299,852, granted October 27, 1942.

As far as possible, all moving parts have been shielded to keep them free of chips and as a safety factor. For the most part the guards 19a, 146a and 201 are of conventional design, but blending with the general styling of the machine. The only guards considered in this description are those which keep the chips clear of the plate lifting mechanism. Sheet metal chip guides 224 and 225, Figs. 11 and 12, are attached to the lifter bars 63 and 105 respectively and serve to guide any chips downward toward the center of the machine. Said guides overlap the plate lifter side pans, 226 and 223, that extend from the plate roller toe bars 65 and 65a downward to above the chip pan 227 which rests in the base of the main frame 1. Said guides and pans thereby form an effective chute for chips turned up by the cutting knives 24 and 25. The chip pan is provided with a suitable handle to simplify its removal for emptying; and strips are placed along the bottom of the pan to make it slide easily.

It will be seen that, by these means, a complete stereotype plate finishing, cooling, and drying machine is provided in which the plates are fed down the machine on freely rotating rolls by gravity, some of which rolls are knurled and provided with positive rotating means, to avoid the uncertainties of a mere gravitational feed at certain points, and some of them are capable of being stopped to help stop the plate. At each end of the shaving arch is provided a reciprocating stop just outside the arch and adapted to be dropped to allow the plate to run into the arch by gravity and to stop the plate completely and accurately to place it in the proper position in the arch. The shaving blade is provided with a spray of lubricant at intervals which always occur when the blades are down to substantially their lowest point in the arch, which lubricant also cools the plate. The plate is raised and lowered in the arch as described and after the shaving operation is loosened and the plate stopped at the bottom of the arch to allow the plate to move out of the shaving arch to the cooling arch where it does not have to be so accurately manipulated. That plate, under the control of a movable roll in the shaving arch, is supplied preferably with water cooling means on both surfaces in the cooling arch. When one plate starts out of the shaving arch the plate that has been described starts out of the cooling arch and is received into the drying position which is the last position of the plate in this machine. In this position a spray of air is introduced against the surfaces of the plate to dry the plate while its final cooling is taking place. This air-drying mechanism is associated with an air conduit controlled by the main shaving shaft for introducing air into the shaving arch and spraying air down through the arch on the top or type surface of the plate before the plate is clamped into the shaving arch. Thus, during a straight drive through the machine, the plate receives its various operations.

Having thus described our invention and the advantages thereof, we do not wish to be limited to the details herein disclosed, otherwise than as set forth in the claims, but what we claim is:

1. The combination in a plate finishing machine, arranged on an incline so that gravity will act to carry a printing plate from station to station, one station being arranged for finishing the concave surface of the plate, a shaving arch above said station, of means for lifting a printing plate and clamping it in said shaving arch, rollers carried by the lifting means for supporting the plate as it enters or leaves the station below the shaving arch, and means for moving the rollers out of contact with the plate as it is lifted and moving the rollers back into contact with the plate as it is lowered.

2. In a plate finishing machine, the combination with a shaving arch, of means for lifting a printing plate therein, rollers carried by the lifting means but out of contact with the plate when the lifting means is at the uppermost and intermediate positions, with means for bringing the rollers into contact with the plate as the lifting means reaches its lowermost position.

3. The combination in a plate finishing machine, of a main frame, a shaving arch and means for lifting a printing plate therein, said means including a clamping bar, a link and an arm, a shaft, said arm being mounted on said shaft, a lever pivoted on the main frame, a cam also secured to said shaft and cooperating with said lever, and means for oscillating said shaft, said link arm, cam and lever in combination serving to control the motion of the clamping bar as it is raised or lowered.

4. In a plate finishing machine, the combination including a main frame, an inclined runway, a shaving arch integral with the main frame of the machine but spaced therefrom to provide an opening, rollers above and below the arch, holdback rollers above and below the arch for controlling the speed of the plate into and out of the arch, and a single means for driving the holdback rollers above and below the arch passing through said opening formed between the arch and main frame.

5. In a finishing machine, including an inclined runway, a shaving arch integral with the main frame of the machine, rollers above and below the arch, holdback rollers above and below the arch for controlling the speed of the plate into and out of the arch, and a single means for driving the holdback rollers above and below the arch, with means for adjusting the holdback rollers to different heights in accordance with the size of the plates being served.

JOHN A. ISBELL.
PAUL L. TOLLISON.
HENRY A. WISE WOOD.
CHARLES L. RICARDS.